Aug. 17, 1937. K. F. J. KIRSTEN 2,090,052
AIRCRAFT
Filed Aug. 20, 1934  2 Sheets-Sheet 1
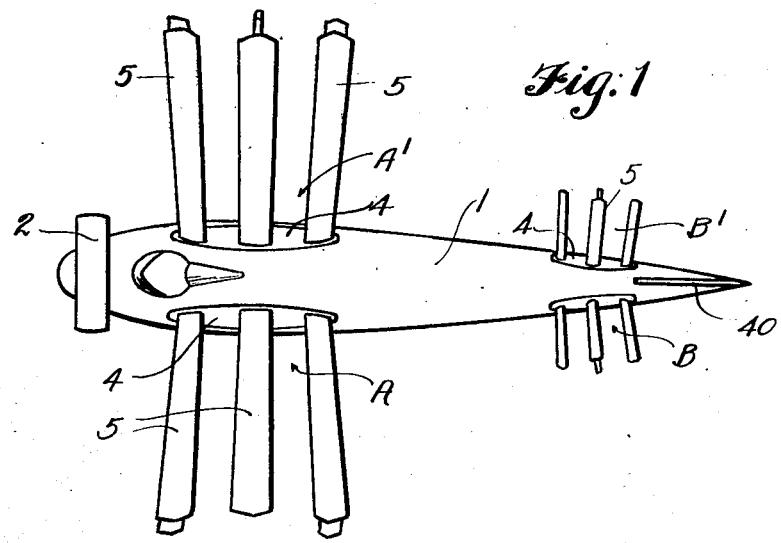
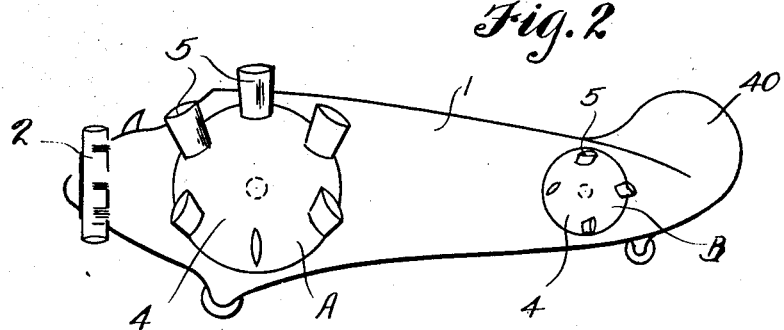
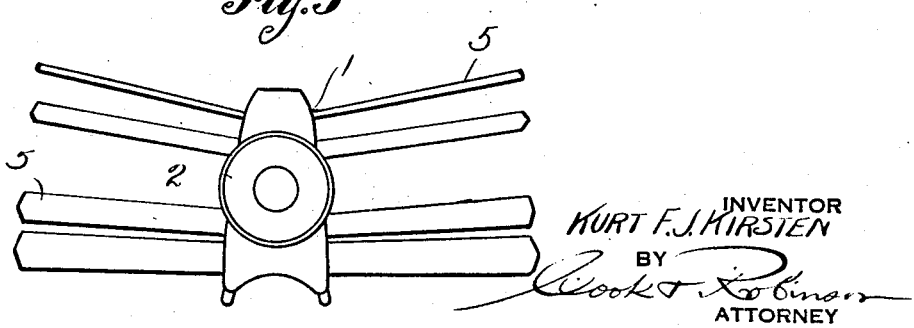
INVENTOR
KURT F. J. KIRSTEN
BY
ATTORNEY Aug. 17, 1937.　　K. F. J. KIRSTEN　　2,090,052
AIRCRAFT
Filed Aug. 20, 1934　　2 Sheets-Sheet 2
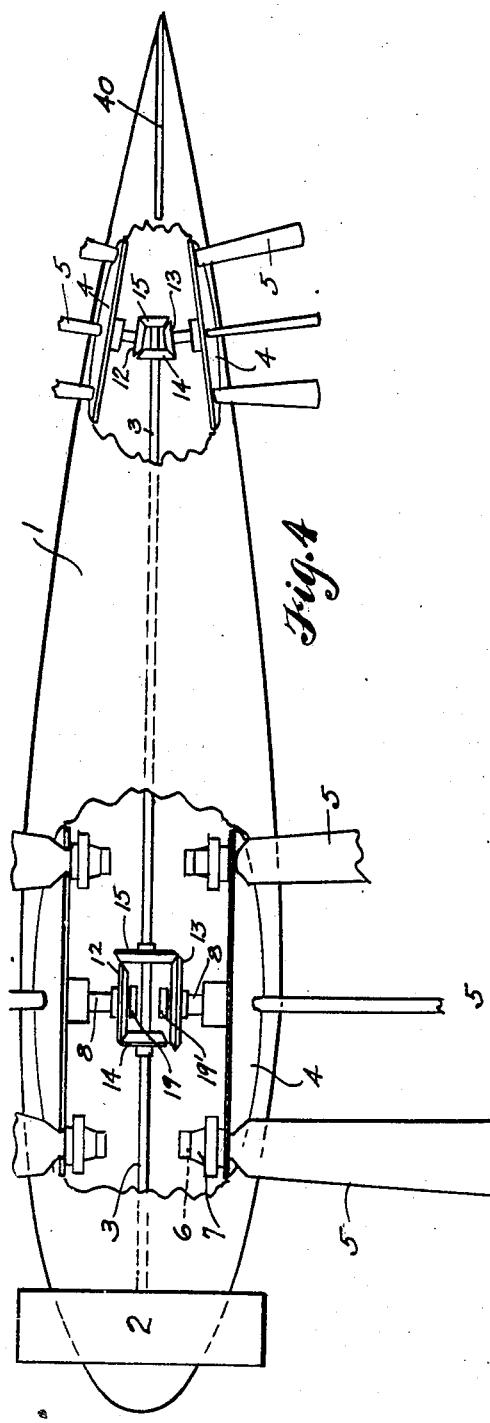
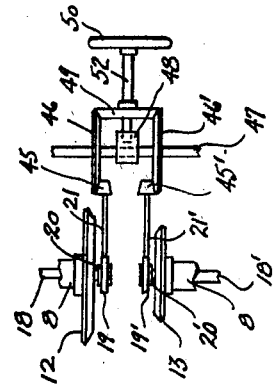
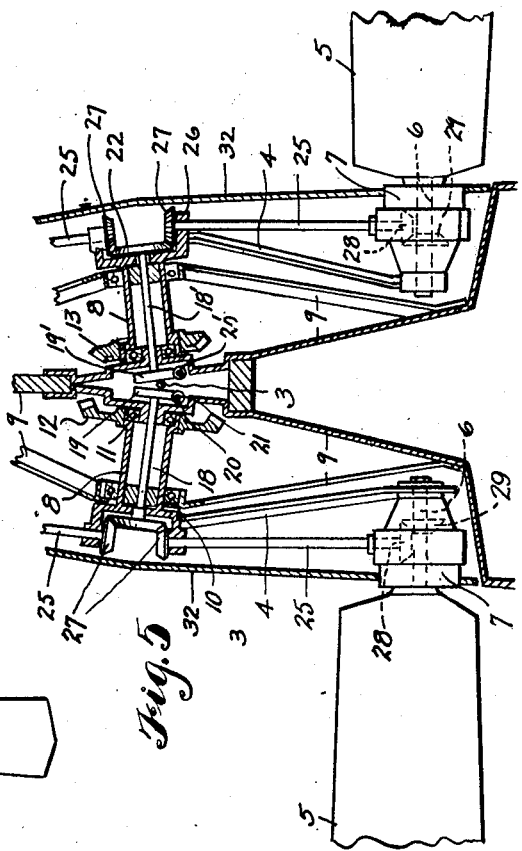
INVENTOR
KURT F. J. KIRSTEN
BY
Cook & Robinson
ATTORNEY Patented Aug. 17, 1937

2,090,052

UNITED STATES PATENT OFFICE 2,090,052

AIRCRAFT

Kurt F. J. Kirsten, Seattle, Wash.

Application August 20, 1934, Serial No. 740,618

8 Claims. (Cl. 244—20)

This invention relates to aircraft, and more particularly to aircraft of the heavier than air types employing cycloidal propulsion devices; the objects of the invention residing in the design, relationship and use of cooperatively arranged cycloidal propellers for propulsion, stabilization and control of aircraft in flight.

It is recognized that propellers of that type known as "cycloidal propellers," have heretofore been applied to aircraft and it is not the intention of this application to seek patent protection on that type of propeller, per se, but rather on the novel use of cycloidal propellers, as applied in a certain relationship to each other and to the fuselage of the craft in which they are used, thereby to obtain maximum efficiency for propulsion and sustentation as well as to make possible perfect control of the craft in taking off, while in flight, and in landing.

In order to impart a better understanding of the present invention, it will here be stated that during the past year much publicity has been given to cycloidal propulsion projects of heavier than air craft. One of the first to appear in various publications was a development of the Rohrbach machine in Germany. Another was a machine built and tested in France by Strandgren. A third, which has appeared in the technical press, is the Platt machine developed in the United States. Also, much prominence has been given recently to cycloidal propulsion in articles appearing in journals of the American Society of Mechanical Engineers under the heading of "Engineering Progress." However, no machine, to my knowledge, has used cycloidal propellers in the present cooperative relationship for purpose of stabilization, propulsion and flight control.

In the known machines, above mentioned, there are certain inherent defects which have been eliminated in the present construction. For instance, in the Rohrbach and Strandgren machines, the propellers are set out from and entirely clear of the body structure, or fuselage, and there are long cylindrical propeller shafts extending into the slip stream, adding much resistance to flight. In the Rohrbach machine in particular there are a great many strut supports for the propeller blades and this is contrary to modern aircraft practice which seeks to eliminate all parts from the slip stream which do not contribute to propulsion and sustentation. The Strandgren machine employs two propellers with short blades and of large rotor diameter which design has also proven to be faulty, particularly because of end losses of its many short blades and its dependence on slip stream momentum for both propulsion and sustentation.

In view of the objectionable and impractical features proven to exist in cycloidal propellers of prior machines, it has been the principal object of this invention to overcome them to a maximum extent by use of cycloidal propellers at opposite sides of the body or fuselage of the craft, each comprising a rotor set flush with the surface of the craft to avoid any possible interference or resistance to flight, and equipped with propeller blades of the cantilever type wherein each blade projects from the fuselage as a monoplane wing.

The invention also provides both front and rear sets of propellers, with those of the rear set coupled with those of the front or forward set, in such manner that the blade speed of all propellers is of the same magnitude and both sets operate to produce a lift in normal flight. Also, the invention provides for differentially controlling the blade angle of the propellers so that they may additionally function both as ailerons and rudder.

Other objects of the invention reside in the details of construction and in the combination of parts and mode of use, as will hereinafter be described.

In accomplishing these and other objects of the invention, I have provided the improved details of construction, the preferred forms of which are illustrated in the accompanying drawings, wherein—

Fig. 1 is a plan, or top view of an airplane equipped with a front and a rear set of cycloidal propellers in accordance with the present invention.

Fig. 2 is a side view of the same.

Fig. 3 is a front end elevation of the airplane.

Fig. 4 is a horizontal section, as on line 4—4 in Fig. 2, illustrating the propeller driving means.

Fig 5 is a cross section, as on line 5—5 in Fig. 4, showing the dihedral of the front set of propellers.

Fig. 6 is a detail of the control device for differentially controlling the blade angle of paired propellers and for control of the axis of symmetry.

Referring more in detail to the drawings—

1 designates the fuselage, or body, of an airplane which may be similar to or one of those of present day design and 2 designates its engine, or power plant, with drive shaft 3 extended in the central longitudinal plane of the craft for operative connection with the forward and rearward sets of cycloidal propellers, as presently described.

The two propellers A and A', comprising the forward set, are located toward the forward end of the fuselage and at opposite sides thereof, as shown in Fig. 1, and the propellers B and B', comprising the rearward set, are similarly located near the rear end or in the tail of the fuselage. Briefly, each propeller comprises a rotor 4 from which extend a plurality of propeller blades 5, arranged in a circle concentric of the rotor. These blades are of the cantilever type and diverge slightly and uniformly from the axis of rotation. Each blade 5 has a journal 6 at its inner end whereby it is rotatably mounted in a bearing sleeve 7 carried at the periphery of the rotor and each rotor has a tubular mounting spindle 8 coaxial thereof whereby it is revolubly supported in a frame structure 9 through the mediacy of anti-friction bearings 10 and 11, as seen in Fig. 5; the frame 9 constituting a part of or is fixed solidly within the fuselage. Fixed on the inner ends, the spindles 8 of paired rotors, respectively, are beveled gears 12 and 13 which mesh respectively with beveled driving gears 14 and 15 on the motor shaft 3; these intermeshing gears being so arranged and in such relative proportion that they will impart rotary motion to the rotors in the same direction and at the same speed.

Rotatably contained coaxially within the spindles 8—8 of the forward pair of rotors are shafts 18—18' which, at their inner ends have worm gears 19—19' fixed thereon in mesh with worm gears 20—20' on adjusting shafts 21—21'. At their outer ends are bevel gears 22, normally held against rotation by reason of the worm gears 20—20 but rotatably adjustable by rotative adjustment of shafts 21 and 21'.

Extending radially of the rotors from the center to each of the propeller blades, are blade adjusting shafts 25 rotatably supported in bearings 26 in the rotor structure. At the inner end of each shaft 25 is a bevel gear 27 meshing with the centrally located gear 22, and fixed on the outer end of each shaft 25 is a bevel gear 28 meshing with a bevel gear 29 fixed on the spindle 6 of the corresponding blade. The relationship and relative sizes of the several gears is such that, with the gears 22 held against rotation, the blades will be caused to rotate once on their axes for each rotation of the rotor and in a direction opposite thereto. Rotatable adjustment of the worm gears 20 and 20' through the medium of the shafts 21 and 21' will effect adjustment of the pitch of the blades, and the control device is such that the blades may be differentially adjusted, as will presently be decribed.

The propellers B and B' of the rear set are like those of the forward set and they are driven in a like manner by connection with the shaft 3 which is extended thereto. Also the blade angle is differentially or uniformly adjustable through geared connection with the shafts 21 and 21'.

The outside of each rotor is covered by a smooth, flat disk 32 and this is flush with the side surface of the fuselage, as shown in Fig. 5. Also the axes of paired rotors are similarly upwardly inclined from the vertical longitudinal plane of the fuselage to form a dihedral that is very desirable from the aero-dynamic standpoint and at the same time creates a very convenient compartment due to the spread of the lower portion of the rotors which can be utilized for the variable fuel load and thus placing the variable load directly in line with the principal lift reactions.

In all aircraft, freedom and control of motion about and along the three axes of space are required. Granting that the motion of the cycloidal aircraft in a horizontal plane, in a vertical plane through the major axis of the craft and in a vertical plane through the propeller axes is as readily achieved as with the airplane, there still remains the problem of pitching, rolling and yawing motions and their control.

For the present type of cycloidal aircraft, pitching is induced by the torque of the blades. This pitching moment is automatically stabilized by placing the center of gravity a sufficient distance below the horizontal axes of the propeller rotors. An increase in torque will tend to swing the mass of the vehicle about the axis of the propeller in a direction opposite to that of the direction of rotation of the rotor. If the topmost blades are made to move in the same direction as the vessel, an increase in torque will displace the center of gravity forward of the pitching axis. This displacement creates a gravitational restoring moment, making the system statically stable. However, as the vessel swings through the displacement angle, the blades are also turned an angle with respect to their former position unless they can be automatically prevented from being influenced by the pitching of the vessel. This increased angle of attack increases the propeller torque still more, which again increases the displacement of the center of gravity. Consequently, this arrangement appears to be dynamically unstable in pitching. The same results are obtained by an analysis of operation under negative slip propellers. Consequently, for cycloidal aircraft which depend only upon a favorable location of the center of gravity for pitching control, a horizontal tail surface must be provided. In the present instance the rearward pair of cycloidal propellers B and B' take the place of the horizontal tail surface, and is the means for controlling pitching. As shown in Fig. 4, the rear pair of cycloidal propellers is coupled with the front pair and in such a way that the blade speeds of all propellers are of the same magnitude. An increase of torque in the front propellers automatically increases the torque of the rear propellers in the same proportion. The rear propellers are arranged to produce a lift in normal flight, that is; both pairs of propellers are lifting surfaces. The lift of the rear propellers multiplied by the distance between centers of front and rear propellers must be equal to the torque of the motor for static stability.

Assuming now that the torque on the front propellers suddenly increases, the rear propellers receive a downward impulse but the slightest downward motion increases the angle of attack of the rear propeller blades. This increases the lift and thus the counter torque on the front propellers. Hence, this system is automatically stable.

Since the blade setting of both sets of propellers is controlled by the pilot, the attitude of the craft in flight may be adjusted at will. Normally the tail propeller control will be coupled with the blade control of the main or forward propellers. However, linkage between the two controls may be made adjustable so as to simulate the adjustability of the airplane elevators. Rolling stability depends upon the adjustment of the blade control for both the starboard and port propellers. Once this adjustment is perfected for operation on an even keel no further balancing mechanisms are required. The slight dihedral in the axes of each pair of propellers is of help in securing dynamic stability, but the most effective recovery movements are the forces dynamically acting on the blades due to a change in the inflow direction of the air when a rolling movement takes place. These recovery movements are very large since the change of inflow direction effects mainly the upper blades, the velocities of which are usually more than twice the velocity of the vessel. Consequently, the present cycloidal aircraft is also statically and dynamically stable in rolling.

An analysis for yawing movements of cycloidal aircraft is somewhat more involved than for the analysis for pitching and rolling. The lift at any slip increases in direct proportion to the angle of blade setting or the shift of the axis of symmetry of the blades from the plane normal to the inflow direction. Similarly, the thrust at all slips increases as the angle of blade setting increases from zero to about fifteen degrees, at which it reaches a maximum for a given blade speed. If the setting of this angle for cycloidal propellers is at values below fifteen degrees in normal flight, any small change in this angle in the positive direction increases both lift and thrust, and a change in the negative direction decreases both lift and thrust. Hence, if the controls of the propellers are differentially coupled; namely, so that the pilot can increase the angle of setting for the starboard propeller and decrease it the same amount for the port propeller, or vice versa, the yawing control is completely established. If he wishes to turn to port, the angle is increased for the starboard propeller and decreased for the port propeller. This increases the thrust on the starboard side and decreases the thrust on the port side, at the same time creating the starboard banking attitude of the vessel on its curved flight path. For this maneuver no rudder is required. This demonstrates that differentially controlled cycloidal propellers perform the function of both the ailerons and rudder of the airplane, and that the cycloidal ship is statically stable in yawing.

In order to make it dynamically stable, a vertical fin, as designated at 40, is attached to the rear of the vessel. However, this fin may not be necessary if the ship is so built that it presents sufficient vertical surface in its body to accomplish the same results.

For differentially controlling the blade angle adjustment of paired propellers, the shafts 18 and 18' are rotated in opposite directions from a neutral setting. To change the angle of symmetry for the propeller blades, the shafts 18 and 18' are rotatably adjusted in unison. For this latter adjustment, the shafts 21 and 21' are extended, as seen in Fig. 6, and are equipped with bevel pinions 45 and 45' meshing with bevel gears 46 and 46' independently revoluble on a supporting shaft 47. A control shaft 52 is rotatably fixed in a bearing 48 revoluble on shaft 47 between gears 46 and 46' and has a gear 49 thereon in mesh with gears 46 and 46'. Oscillation of the shaft effects a simultaneous rotation of the gears 45 and 45' and a similar rotative adjustment of the worm gears to thereby change the angle of symmetry of both propellers to the same extent. Rotation of the control shaft in opposite direction by means of the wheel 50 at its end effects an opposite rotative adjustment of the worm gears and a differential adjustment of the propeller blade angles.

Having thus described my invention, what I claim as new therein and desire to secure by Letters Patent is—

1. In an aircraft of the character described, a cycloidal propeller comprising a rotor and a plurality of propeller blades extending therefrom; said rotor being set flush within the slip stream surface of the fuselage in planes substantially parallel to the direction of travel of the aircraft and said blades being extended into the slip stream substantially perpendicular to the plane of the rotor.

2. In an aircraft of the character described, a cycloidal propeller comprising a rotor, and a plurality of propeller blades of cantilever type extending from the rotor equally spaced about and at equal distances substantially spaced from the axis of rotation; said rotor being set flush within the slip stream surface of the fuselage in a plane substantially parallel to the direction of flight and said blades being set in uniform diverging relationship.

3. In an aircraft of the character described, a pair of cycloidal propellers arranged at opposite sides of the fuselage of the craft; each comprising a rotor disk set flush within the slip stream surface of the fuselage in planes parallel with the direction of flight and having a plurality of propeller blades mounted thereon at distances equally spaced from the axis of rotation and extending into the slip stream substantially perpendicular to the disk and means for rotating said rotors in unison.

4. A device, as in claim 3, wherein means is provided for differentially changing the pitch of the blades of the two propellers.

5. A device, as in claim 3, wherein means is provided for changing the angle of symmetry of the propellers.

6. A device, as in claim 3, wherein control means is provided whereby the pitch of the blades of the two propellers may be differentially changed and whereby the axes of symmetry may be changed.

7. In an aircraft of the character described, a set of forward cycloidal propellers, a set of rearward cycloidal propellers, each propeller including a plurality of blades mounted on a rotor disk disposed in a plane flush with the slip stream surface of the fuselage and parallel to the direction of flight and a driving shaft and gearing operatively connecting said rotors of the two sets for cooperative performance.

8. In an aircraft of the character described, a forward set of cycloidal propellers, a rearward set of cycloidal propellers, each comprising rotor disks mounted flush with the slip stream surface at opposite sides of the fuselage and propeller blades on said disks symmetrically arranged about and substantially perpendicular to the axis of rotation driving a driving shaft and gearing operatively connecting the two sets of propellers, and gearing operatively controlling the axial rotation of the individual propellers and whereby the pitch of blades of the two sets may be differentially regulated and whereby the angle of symmetry may be changed.

KURT F. J. KIRSTEN.